(12) United States Patent
Anders et al.

(10) Patent No.: US 11,070,139 B2
(45) Date of Patent: Jul. 20, 2021

(54) SYSTEMS AND METHODS TO ESTIMATE MAGNETIC FLUX IN A SWITCHED MODE POWER SUPPLY

(71) Applicant: Illinois Tool Works Inc., Glenview, IL (US)

(72) Inventors: Adam E. Anders, Oshkosh, WI (US); Brian Schwartz, Appleton, WI (US); Andrew D. Nelson, Appleton, WI (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 538 days.

(21) Appl. No.: 15/489,321

(22) Filed: Apr. 17, 2017

(65) Prior Publication Data

US 2018/0302002 A1    Oct. 18, 2018

(51) Int. Cl.
*B23K 9/10*    (2006.01)
*H02M 5/458*    (2006.01)
(Continued)

(52) U.S. Cl.
CPC ......... *H02M 5/4585* (2013.01); *B23K 9/1006* (2013.01); *H02M 1/40* (2013.01); *H02M 1/4233* (2013.01); *H02M 2007/4803* (2013.01)

(58) Field of Classification Search
CPC ...... B23K 9/1006–1037; B23K 9/1075; B23K 9/1081; H02M 1/40; H02M 1/4233; H02M 2007/4803; H02M 5/4585
(Continued)

(56) References Cited

U.S. PATENT DOCUMENTS

| 4,439,822 A | 3/1984 | Cocconi |
| 5,012,400 A * | 4/1991 | Yasuda ................... H02M 1/12 363/39 |

(Continued)

FOREIGN PATENT DOCUMENTS

WO    2016073145    5/2016

OTHER PUBLICATIONS

Ortiz, G., et al. Flux Balancing of Isolation Transformers and Application of "the Magnetic Ear" for Closed-Loop Volt-Second Compensation, IEEE Transactions on Power Electronics, vol. 29, No. 8, pp. 4078-4090, Aug. 2014 (14 pages).
(Continued)

*Primary Examiner* — Sang Y Paik
(74) *Attorney, Agent, or Firm* — McAndrews. Held & Malloy, Ltd.

(57) ABSTRACT

Systems and methods to estimate magnetic flux in a switched mode power supply are disclosed. An example welding-type power supply includes a switched mode power supply, comprising: a transformer configured to transform an input voltage to a welding-type voltage; a capacitor in series with a primary winding of the transformer; and switches configured to control a voltage applied to a series combination of the primary winding of the transformer and the capacitor; a voltage estimator coupled to the transformer and configured to output a signal representative of an alternating-current (AC)-coupled voltage at the capacitor; and a flux accumulator to determine a net flux in the transformer based on the voltage applied to the series combination of the primary winding of the transformer and the capacitor.

21 Claims, 5 Drawing Sheets

(51) Int. Cl.
  *H02M 1/42* (2007.01)
  *H02M 1/40* (2007.01)
  *H02M 7/48* (2007.01)

(58) Field of Classification Search
  USPC .............. 219/130.01–130.51, 133–137 PS
  See application file for complete search history.

(56) References Cited

U.S. PATENT DOCUMENTS

| | | | |
|---|---|---|---|
| 5,446,641 | A | 8/1995 | Reynolds et al. |
| 5,824,990 | A | 10/1998 | Geissler et al. |
| 5,867,376 | A * | 2/1999 | Nakamura .............. H02M 7/48 |
| | | | 363/132 |
| 5,926,381 | A | 7/1999 | Moriguchi |
| 6,815,639 | B2 | 11/2004 | Geissler |
| 7,420,351 | B2 | 9/2008 | Grbovic |
| 9,647,555 | B2 | 5/2017 | Kooken |
| 9,855,620 | B2 | 1/2018 | Kooken |
| 9,862,052 | B2 | 1/2018 | Vogel |
| 10,500,669 | B2 | 12/2019 | Schartner |
| 2007/0070655 | A1 | 3/2007 | Eguchi |
| 2013/0088895 | A1* | 4/2013 | Ye .......................... H02M 1/40 |
| | | | 363/17 |
| 2014/0021180 | A1 | 1/2014 | Vogel |
| 2015/0053660 | A1 | 2/2015 | Schartner et al. |
| 2015/0365005 | A1 | 12/2015 | Panov |

OTHER PUBLICATIONS

Int'l Search Report and Written Opinion for PCT/US2018/023507 dated Jul. 3, 2018 (15 pgs).

Int'l Search Report and Written Opinion for PCT/US2019/013573 dated May 10, 2019 (21 pgs).

PCT, Notification of Transmittal of the International Search Report and the Written Opinion of the International Searching Authorityk or the Declaration, in Application No. PCT/US2018/055804, dated Jan. 21, 2019 (11 pages).

PCT, Notification Concerning Transmittal of International Preliminary Report on Patentability, in Application No. PCT/US2018/023507, dated Oct. 31, 2019 (10 pages).

* cited by examiner

SYSTEMS AND METHODS TO ESTIMATE MAGNETIC FLUX IN A SWITCHED MODE POWER SUPPLY

BACKGROUND

The invention relates generally to welding systems and, more particularly, to systems and methods to estimate magnetic flux in a switched mode power supply.

A type of conventional welding-type power supply that is well suited for portability and for receiving different input voltages is a multi-stage system with a pre-regulator to condition the input power and provide a stable bus, and an output circuit that converts or transforms the stable bus to a welding-type output. Such conventional welding-type power supplies using transformers that are subject to magnetic saturation, which may be referred to as a volt-second rating. If the transformer is saturated, the system can become unusable.

SUMMARY

Systems and methods to estimate magnetic flux in a switched mode power supply are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
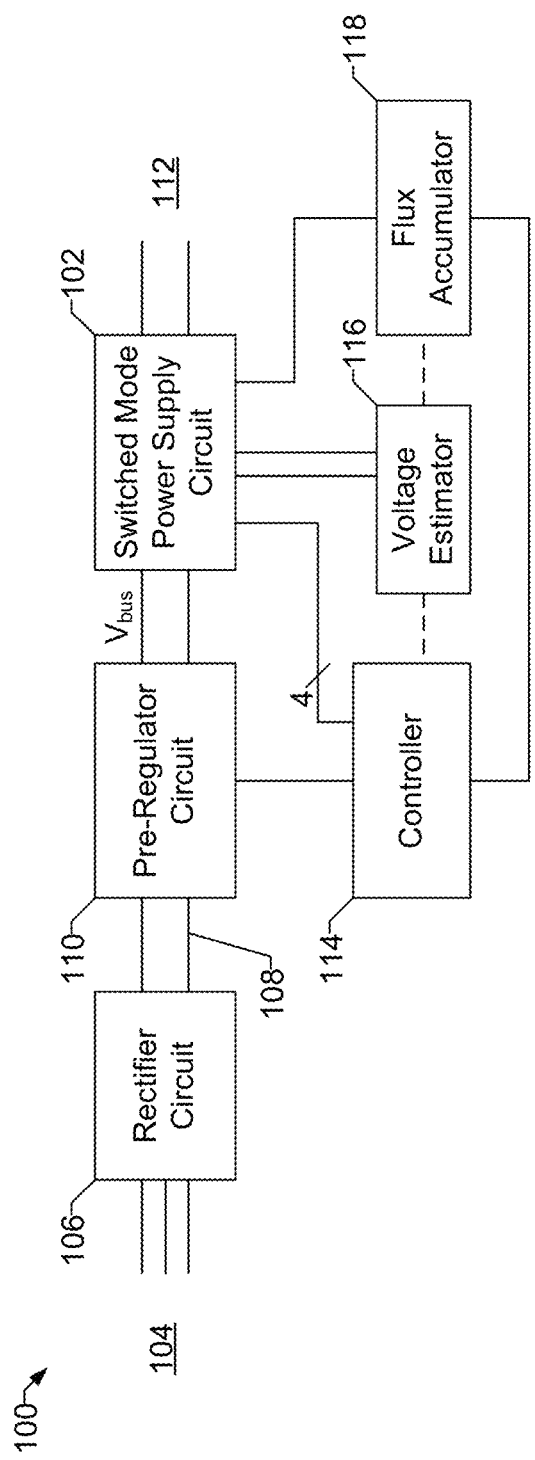
FIG. 1 is a block diagram of an example welding-type power supply, including a switched mode power supply topology, configured to estimate magnetic flux in a transformer of the switched mode power supply, in accordance with aspects of this disclosure.

Conventional welding-type power supplies use one or more of the following methods to avoid saturation of the high-frequency transformer: 1) an instantaneous flux limit that restricts the duty cycle in either polarity to an upper limit; 2) flux balancing, which limits how quickly the flux applied is able to change to keep the positive and negative cycles closer to balancing on an instantaneous basis to avoid exceeding the volt-second rating in one direction; and flux centering, in which the magnetic flux applied to the transformer is continually summed during each switching period. Flux centering acts to modify the positive and negative duty cycles over time to maintain the accumulated flux near zero.

One shortcoming of conventional flux centering is that the method assumes that one-half of the bus voltage is applied in both the positive and negative direction. However, if the series capacitor is not charged to one-half of the bus voltage, asymmetrical voltage can be applied without knowledge of the flux centering logic. For example, if the bus is at 600V, and the series cap is at 310V, the voltage applied to the transformer during the positive half cycle is 290V, and during the negative cycle it is 310V. This results in a volt-second mismatch applied to the transformer. A conventional flux accumulator assumes that 300V is applied in both directions, so the flux accumulator does not identify the voltage imbalance. If the capacitor remains imbalanced for several PWM cycles, a net volt-second imbalance can accumulate and the transformer can be driven into saturation, resulting in an error condition and/or unexpected shutdown of the welding power supply.

Disclosed example systems and methods improve tracking and/or centering of magnetic flux in welding-type power supplies utilizing switched mode power supplies. In some examples, a current through a series capacitor on a primary side of a high frequency transformer in a switched mode power supply is measured to determine an actual AC-coupled voltage applied to the primary of the transformer. The actual voltage is then used to accurately track and/or correct the magnetic flux in the high frequency transformer.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type voltage" refers to a voltage suitable for welding, plasma cutting, induction heating, CAC-A, and/or hot wire welding/preheating (including laser welding and laser cladding).

Disclosed example welding-type power supplies include a switched mode power supply, a voltage estimator, and a flux accumulator. The switched mode power supply includes a transformer to transform an input voltage to a welding-type voltage, a capacitor in series with a primary winding of the transformer, and switches to control a voltage applied to a series combination of the primary winding of the transformer and the capacitor. The voltage estimator is coupled to the transformer and outputs a signal representative of an alternating-current (AC)-coupled voltage at the capacitor. The flux accumulator determines a net flux in the transformer based on the voltage applied to the series combination of the primary winding of the transformer and the capacitor.

Additional disclosed welding-type power supplies include a switched mode power supply and a flux accumulator configured to monitor a voltage at a capacitor coupled in series to a transformer to estimate magnetic flux in the transformer.

Some example power supplies further include a current transformer coupled to the capacitor, in which the voltage estimator determines the AC-coupled voltage at the capacitor by measuring the current flowing through the current transformer. In some such examples, the voltage estimator includes an integrator and a filter to convert the current to a measurement of the AC-coupled voltage across the capacitor.

Some example power supplies further include a controller to control the switches based on the net flux in the transformer and the signal representative of the AC-coupled voltage at the capacitor. In some such examples, the controller controls the switches to maintain the net flux in the transformer within a predetermined amount from zero. In some such examples, the controller applies a corrective factor to the net flux for controlling the switching when the signal representative of the AC-coupled voltage is outside of a range.

In some examples, the voltage estimator is configured to measure the voltage of the capacitor, measure the voltage at the primary of the transformer, measure a voltage at a secondary winding of the transformer, or measure a voltage at a third winding of the transformer. In some examples, the flux accumulator determines the net flux in the transformer based on the signal representative of the AC-coupled voltage. Some such examples further include a controller configured to modify duty cycles of the switches based on the net flux in the transformer. In some examples, the switched mode power supply is a stacked full bridge configuration, a half bridge configuration, or a full bridge configuration.

Disclosed example methods, include generating a signal representative of an alternating-current (AC)-coupled voltage at a capacitor coupled to a primary of a transformer of a switched mode power supply, determining a net flux in the transformer, and controlling switches of the switched mode power supply to apply a voltage to the transformer based on the net flux in the transformer and the signal representative of the AC-coupled voltage at the capacitor.

Some example methods further include applying a corrective factor to the net flux when the signal representative of the AC-coupled voltage is outside of a range. In some examples, generating the signal representative of the AC-coupled voltage involves measuring the current through a current transformer coupled to the primary of the transformer. In some such examples, generating the signal representative of the AC-coupled voltage further involves integrating and filtering samples of the current through the current transformer. Some such examples further involve determining a corrective factor based on the signal, in which determining the net flux in the transformer is based on the corrective factor.

In some example methods, controlling the switches involves maintaining the net flux in the transformer within a predetermined amount from zero. In some examples, determining the net flux in the transformer is based on the signal representative of the AC-coupled voltage. In some examples, controlling the switches involves modifying duty cycles of the switches based on the net flux in the transformer. In some examples, controlling the switches involves controlling a stacked full bridge configuration, a half bridge configuration, or a full bridge configuration.

In some example methods, determining the AC-coupled voltage involves at least one of measuring the voltage at the capacitor, measuring the voltage at the primary of the transformer, measuring the voltage at a secondary winding of the transformer, or measuring the voltage at a third winding of the transformer. Some example methods further involve controlling the switched mode power supply to transform an input voltage to a welding-type voltage or a welding-type current.

FIG. 1 is a block diagram of an example welding-type power supply 100, including a switched mode power supply topology 102, configured to estimate magnetic flux in a transformer of the switched mode power supply 102. The example welding-type power supply 100 of FIG. 1 receives an AC line voltage 104 (e.g., AC single-phase or three-phase power) at a rectifier 106.

The rectifier 106 rectifies the AC line voltage 104. Example values for the AC line voltage 104 can range from 115 VAC or lower to 600 VAC. The power supply 100 may be designed for a single nominal AC line voltage and/or for a range of AC line voltages. The rectifier 106 may include a filter capacitor, and provides a rectified line voltage 108.

A pre-regulator 110 provides a regulated bus voltage (e.g., $V_{bus}$), which may be regulated to a voltage greater than the peak of the rectified line voltage 108. The pre-regulator circuit 110 may also contain a power factor correction circuit and/or control to improve the power factor for the current or power drawn from the line voltage 104. The pre-regulator circuit 110 may include a boost converter circuit arrangement.

The switched mode power supply 102 receives the regulated bus voltage $V_{bus}$ and outputs welding-type power 112. As described in more detail below, the switched mode power supply 102 includes a high frequency transformer that has a saturation point for magnetic flux.

The example power supply 100 includes a controller 114 that controls the pre-regulator circuit 110 and the switched mode power supply 102. For example, the controller 114 may control switching of a power semiconductor in the pre-regulator circuit 110 to control the regulated bus voltage $V_{bus}$. The controller 114 may control the switching of the power semiconductor in the pre-regulator circuit 110 so as to provide a regulated bus voltage $V_{bus}$ as well as to perform power factor correction.

The controller 114 is a circuit, including digital and/or analog circuitry, discrete and/or integrated circuitry, microprocessors, DSPs, etc., software, hardware and/or firmware, located on one or more circuit boards, that form part or all of a controller, and are used to control a welding process, or a device such as a power source.

Figure 2:
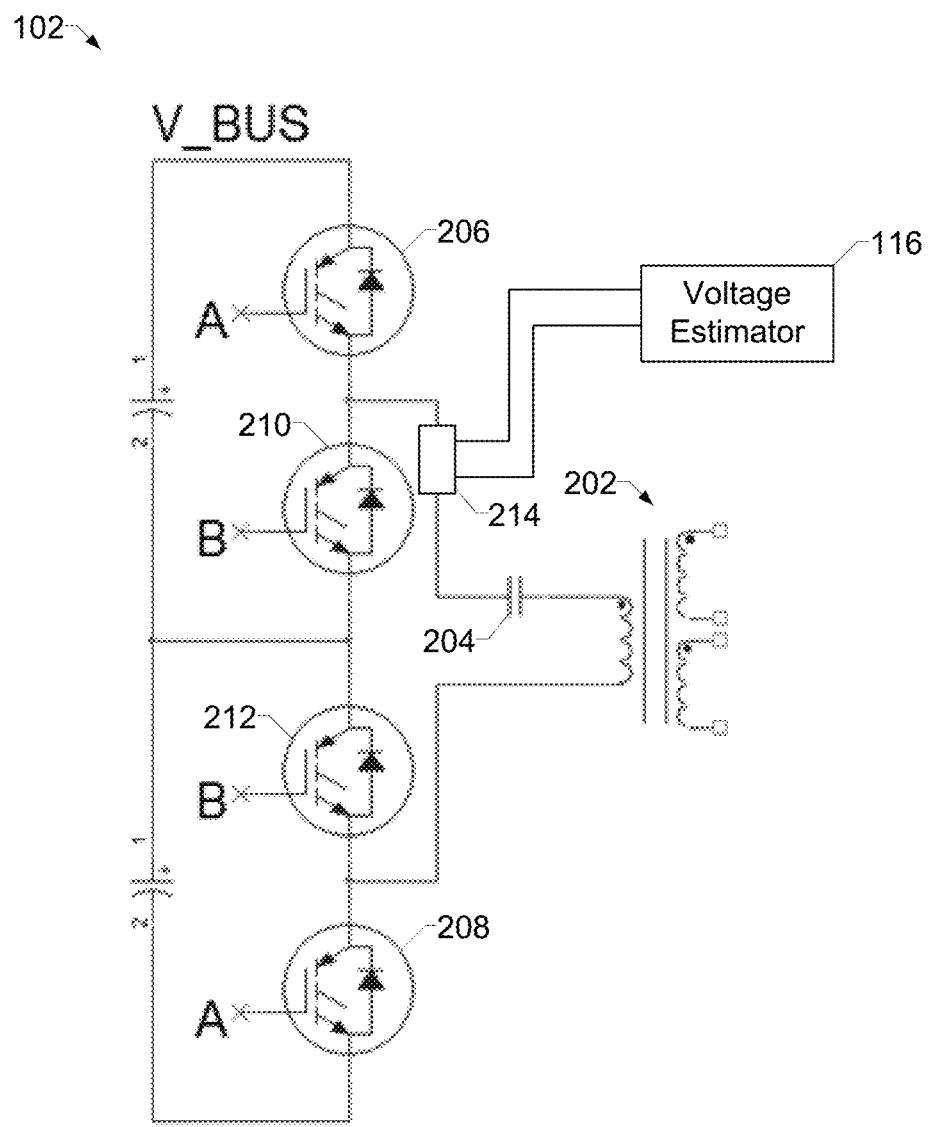
FIG. 2 is a schematic diagram of an example implementation of the switched mode power supply of FIG. 1, including a full stacked bridge topology

FIG. 2 is a schematic diagram of an example implementation of the switched mode power supply 102 of FIG. 1, including a full stacked bridge topology. The switched mode power supply 102 of FIG. 2 receives the regulated bus voltage $V_{bus}$, controls a voltage provided to a primary side of a high-frequency transformer 202, and outputs the welding-type power 112 from a secondary side of the transformer 202.

The switched mode power supply 102 of FIG. 2 includes a capacitor 204 in series with the high-frequency transformer 202. The capacitor 204 stands off approximately half of the bus voltage $V_{bus}$. The capacitor 204 allows for bidirectional current flow in the transformer 202, and has a voltage $V_{cap}$ across the capacitor 204. The switched mode power supply 102 further includes switching elements 206, 208, 210, 212, labeled "A" and "B" in FIG. 2 to illustrate control of the switching elements. The example switching elements 206-212 may be insulated-gate bipolar transistors (IGBTs).

The transformer 202 is driven with a positive voltage for a positive half-cycle by turning on the "A" switching elements 206, 208, which applies a voltage equal to $V_{bus}$-$V_{cap}$ to the primary of the transformer 202. A negative half-cycle is accomplished by turning on the "B" switching elements 210, 212, which applies a voltage equal to $-V_{cap}$ to the primary of the transformer 202. The nominal value of $V_{cap}$ is $V_{bus}/2$, so the positive and negative half-cycles both nominally apply voltages of $V_{bus}/2$, with opposite polarities for the different half-cycles. In each of the positive half-cycle and the negative half-cycle, the magnetic flux in the core of the transformer 202 changes in accordance with the applied voltage and current. When the positive half-cycle and the negative half-cycle are on for the same lengths of time, the net magnetic flux (volt-seconds) applied to the transformer 202 is zero over the course of one period (i.e., one positive half-cycle and one negative half-cycle). The transformer 202 has a volt-second rating that is can withstand before it saturates. While the flux is balanced, the switched mode power supply 102 avoids saturating the transformer 202.

The example switched mode power supply 102 pre-biases the capacitor 204 to have a capacitor voltage $V_{cap}$ of half the bus voltage $V_{bus}$ (e.g., using balancing resistors before the switched mode power supply 102 is enabled to provide an output). The capacitance value of the example capacitor 204 is such that the capacitor voltage $V_{cap}$ may only change by a few volts above and below one half the bus voltage $V_{bus}$ at twice the switching frequency of the switching elements 206-212 (e.g., a PWM frequency) under normal circumstances. However, under dynamic load conditions, or current commands, the capacitor 204 may deviate farther from its nominal voltage.

Returning to FIG. 1, to reduce the likelihood of saturating the transformer 202 in the switched mode power supply 102, the example welding-type power supply 100 further includes a voltage estimator 116 and a flux accumulator 118.

The voltage estimator 116 is coupled to the transformer 202 and/or the capacitor 204 of the switched mode power supply 102, and measures an alternating-current (AC) through the capacitor 204. The voltage estimator 116 converts the measured alternating current to a signal representative of an AC-coupled voltage at the capacitor. An AC-coupled voltage of the capacitor 204 refers to the AC component of the capacitor voltage, which excludes the DC component of the capacitor voltage.

To enable the voltage estimator 116 to determine the AC-coupled voltage, the switched mode power supply 102 of FIG. 2 includes a current transformer 214 coupled in series with the capacitor 204 to measure current through the capacitor 204 and/or the primary of the high-frequency transformer 202. The current transformer 214 is also coupled to the voltage estimator 116, and the voltage estimator 116 determines the AC-coupled voltage at the capacitor 204 by measuring the current flowing through the current transformer 214.

In some other examples, the capacitor voltage $V_{cap}$, the voltage across the primary of the high frequency transformer 202, the voltage across the secondary of the high frequency transformer 202, and/or the voltage across any other winding of the high frequency transformer 202 (e.g., tertiary winding, etc.) may be directly measured (e.g., using a high-voltage differential amplifier or high voltage single-ended amplifier). Use of a high-voltage differential amplifier involves additional wiring in the power source relative to the current transformer, and decreases insulation resistance (e.g., increases leakage current) from the primary winding of the high frequency transformer 202 to a ground reference.

The flux accumulator 118 determines a net flux in the transformer 202 based on the voltage applied to the series combination of the primary winding of the transformer 202 and the capacitor 204. For example, the flux accumulator 118 may integrate the flux in the transformer 202 to maintain history of the net flux (e.g., volt*sec) that has been applied to the transformer 202. In some examples, the flux accumulator 118 tracks the PWM values output by the controller 114 to the switches 206-212. The flux accumulator 118 calculates the net flux by adding the positive PWM value and subtracting the negative PWM value, to a running accumulator.

The controller 114 controls the switches 206-212 in the switched mode power supply 102 based on the net flux in the transformer 202 (e.g., determined by the flux accumulator 118) and based on the signal representative of the AC-coupled voltage at the capacitor 204 (e.g., determined by the voltage estimator 116). In some examples, the controller 114 controls the switches 206-212 to maintain the net flux in the transformer 202 within a predetermined amount from zero and/or at least a predetermined distance from saturation.

In some examples, the controller 114 receives the signal representative of the AC-coupled voltage from the voltage estimator 116, receives the net flux value from the flux accumulator 118, and calculates a corrective value to be used to control the switching elements 206-212 to correct for net flux that exceeds an acceptable value. For example, if the net flux increases above an upper (e.g., positive) flux threshold and/or the signal representative of the AC-coupled voltage is greater than an upper threshold limit, the controller 114 adjusts the PWM control signals to increase the negative half-cycle and decrease the positive half-cycle. Conversely, if the net flux decreases below a lower (e.g., negative) flux threshold and/or the signal representative of the AC-coupled voltage is less than a lower threshold limit, the controller 114 adjusts the PWM control signals to increase the positive half-cycle and decrease the negative half-cycle.

Figure 3:
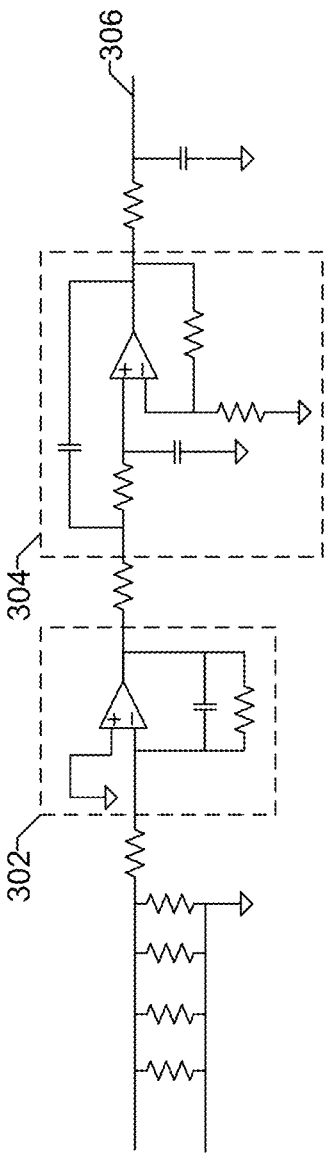
FIG. 3 is a schematic diagram of an example integrator and filter that may be used to implement the voltage estimator of FIG. 1.

FIG. 3 is a schematic diagram of an example implementation of the voltage estimator 116 of FIG. 1, including an integrator 302 and a filter 304. The example voltage estimator 116 of FIG. 3 receives a current signal from the current transformer 214 of FIG. 2 and converts the current signal to an AC-coupled measurement of the voltage of the capacitor 204 using the I=C*dv/dt relationship of the capacitor 204, and outputs the AC-coupled voltage as an output signal 306.

After calculating the AC-coupled voltage, the example controller 114 of FIG. 1 may set upper and/or lower thresholds on the AC-coupled voltage and, in response to detecting that the AC-coupled voltage exceeds either of the threshold(s), applying a correction factor to a net flux output by the flux accumulator 118.

Additionally or alternatively, the flux accumulator 118 and/or the controller 114 may use the AC-coupled voltage measurement to weight changes in the magnetic flux determined by the flux accumulator 118 on a cycle-by-cycle basis. Weighting the flux measurements would increase the accuracy of tracking the flux applied to the high-frequency transformer 202. Improving accuracy of flux tracking by the flux accumulator 118 enables conventional flux centering operations to effectively provide flux centering (e.g., without overt correction actions by the controller 114).

Figure 4:
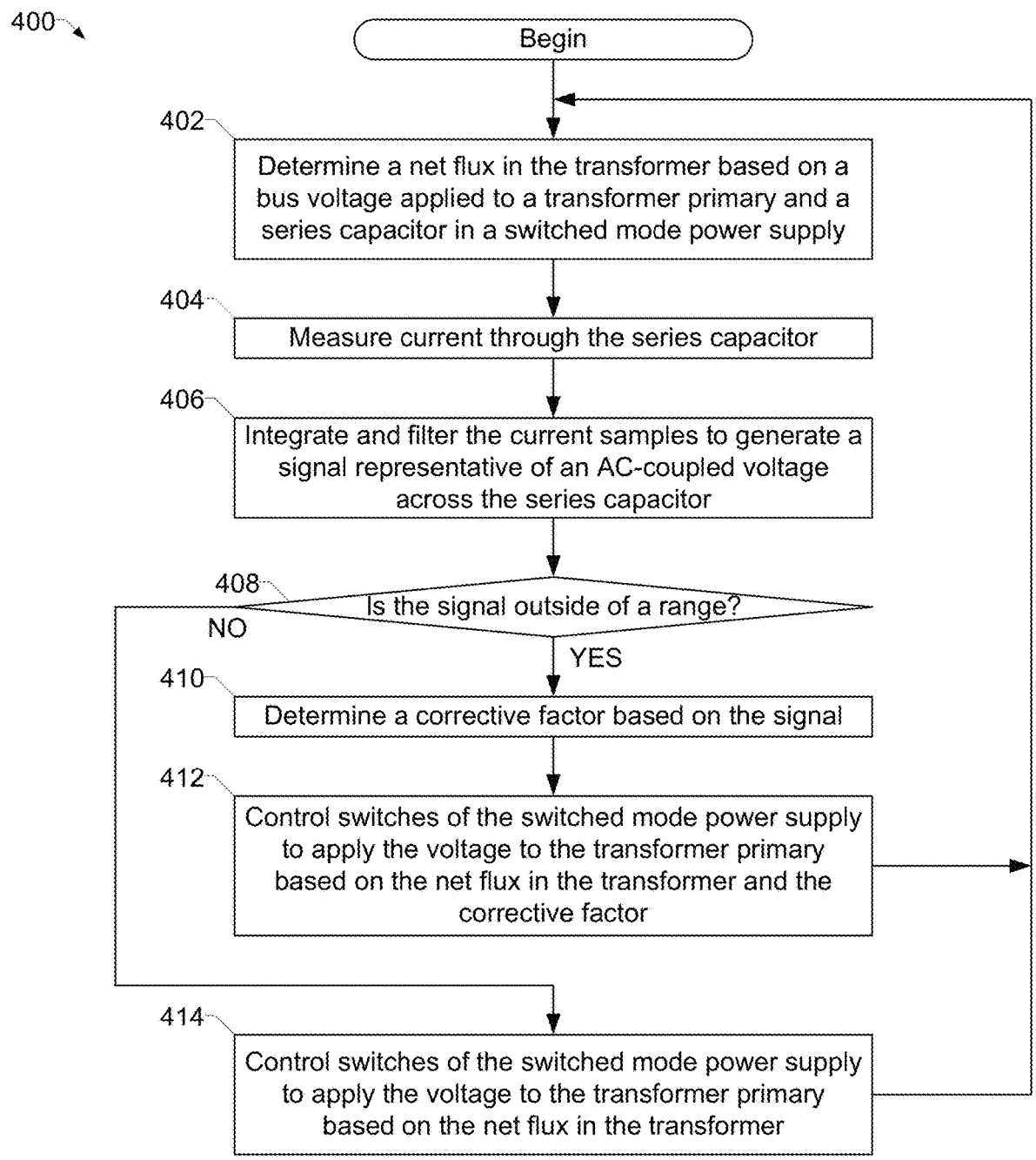
FIG. 4 is a flowchart representative of example method that may be performed by the example welding-type power supply of FIG. 1 to estimate magnetic flux in a transformer of a switched mode power supply in the welding-type power supply.

FIG. 4 is a flowchart representative of example method 400 that may be performed by the example welding-type power supply 100 of FIG. 1 to estimate magnetic flux in a transformer of the switched mode power supply 102 in the welding-type power supply 100.

At block 402, the example flux accumulator 118 of FIG. 1 determines a net flux in the high-frequency transformer 202 of FIG. 2 based on a bus voltage (e.g., $V_{bus}$) applied to the transformer primary and the series capacitor in the switched mode power supply 102. For example, the flux accumulator 118 may monitor durations of positive and negative PWM cycles based on the nominal bus voltage $V_{bus}$.

At block 404, the voltage estimator 116 measures a current through the series capacitor 204. For example, the voltage estimator 116 may receive a current signal from the current transformer 214. At block 406, the voltage estimator 116 integrates and filters the current signal to generate a signal representative of an AC-coupled voltage across the series capacitor 204.

At block 408, the controller 114 determines whether the signal is outside of a range. For example, the range may be an acceptable upper AC-coupled voltage limit and/or an acceptable lower AC-coupled voltage limit. If the signal is outside of the range (block 408), at block 410 the controller 114 determines a corrective factor based on the signal. The corrective factor may be a magnetic flux adjustment to be applied to the transformer 202 by, for example, adjusting the PWM signals to bring the magnetic flux closer to zero and/or farther from saturation.

At block 412, the controller 114 controls the switches 206-212 of the switched mode power supply 102 to apply the bus voltage $V_{bus}$ to the primary of the transformer 202 based on the net flux in the transformer 202 and the corrective factor. The controller 114 controls the switches 206-212 to transform an input voltage to a welding-type voltage.

If the signal is not outside of the range (block 408), at block 414 the controller 114 controls the switches of the switched mode power supply to apply the voltage to the primary of the transformer 202 based on the net flux in the transformer 202. For example, block 414 may be implemented using conventional flux tracking and/or correction techniques. The controller 114 controls the switches 206-212 to transform an input voltage to a welding-type voltage.

After controlling the switches (block 412 or block 414), control returns to block 402.

Figure 5:
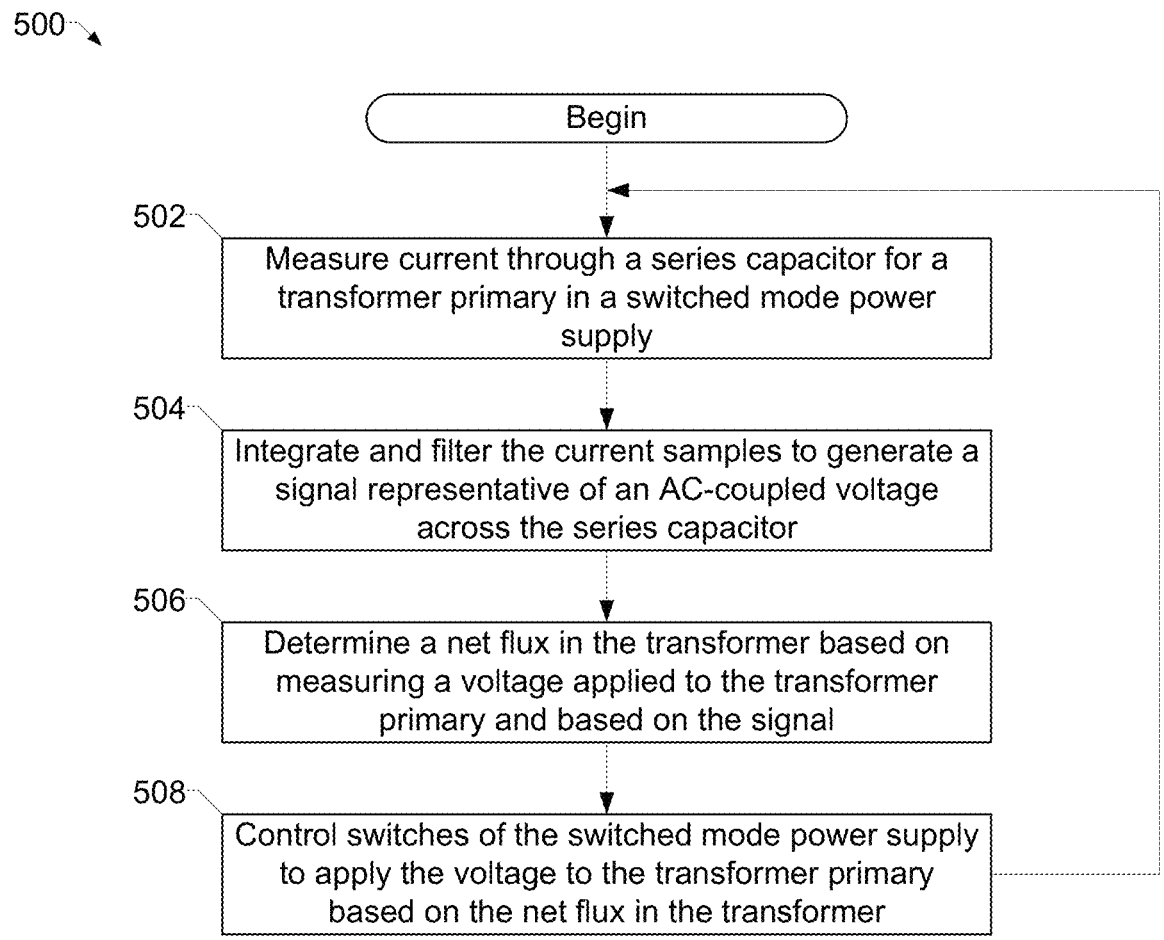
FIG. 5 is a flowchart representative of example method that may be performed by the example welding-type power supply of FIG. 1 to estimate magnetic flux in the transformer of the switched mode power supply.

FIG. 5 is a flowchart representative of example method 500 that may be performed by the example welding-type power supply 100 of FIG. 1 to estimate magnetic flux in the transformer 202 of the switched mode power supply 102. The example method 500 may be implemented instead of the method of FIG. 4 to enable the controller 114 to adjust the magnetic flux on a cycle-by-cycle basis instead of using a corrective factor when the flux or bus voltage are outside of a target range.

At block 502, the voltage estimator 116 of FIG. 1 measures the current through the series capacitor 204 for the high-frequency transformer 202. For example, the voltage estimator 116 may receive a current signal from the current transformer 214. At block 504, the voltage estimator 116 integrates and filters the current signal to generate a signal representative of an AC-coupled voltage across the series capacitor 204.

At block 506, the flux accumulator 118 determines a net flux in the transformer 202 based on measuring a voltage applied to the primary of the transformer 202 and based on the signal representative of the AC-coupled voltage.

At block 508, the controller 114 controls the switches 206-212 of the switched mode power supply 102 to apply the bus voltage $V_{bus}$ to the primary of the transformer 202 based on the net flux in the transformer 202 (e.g., determined by the flux accumulator 118). For example, if the controller 114 may adjust the durations of the positive half-cycle and/or the negative half-cycle of a stacked full bridge configuration based on the net flux in the transformer 202. The controller 114 controls the switches 206-212 to transform an input voltage to a welding-type voltage.

While FIGS. 4 and 5 are described with reference to measuring current through the series capacitor 204 and integrating and filtering the current to determine a voltage across the series capacitor 204, the example methods of FIGS. 4 and 5 may alternatively be implemented by directly measuring the voltage across the series capacitor 204 using a high voltage differential amplifier.

While the examples above are described with reference to a stacked full bridge configuration, aspects of this disclosure may be applied to other configurations such as half bridge configurations and/or full bridge configurations, in which the primary of the high frequency transformer is coupled in series with a capacitor.

Figure 6:
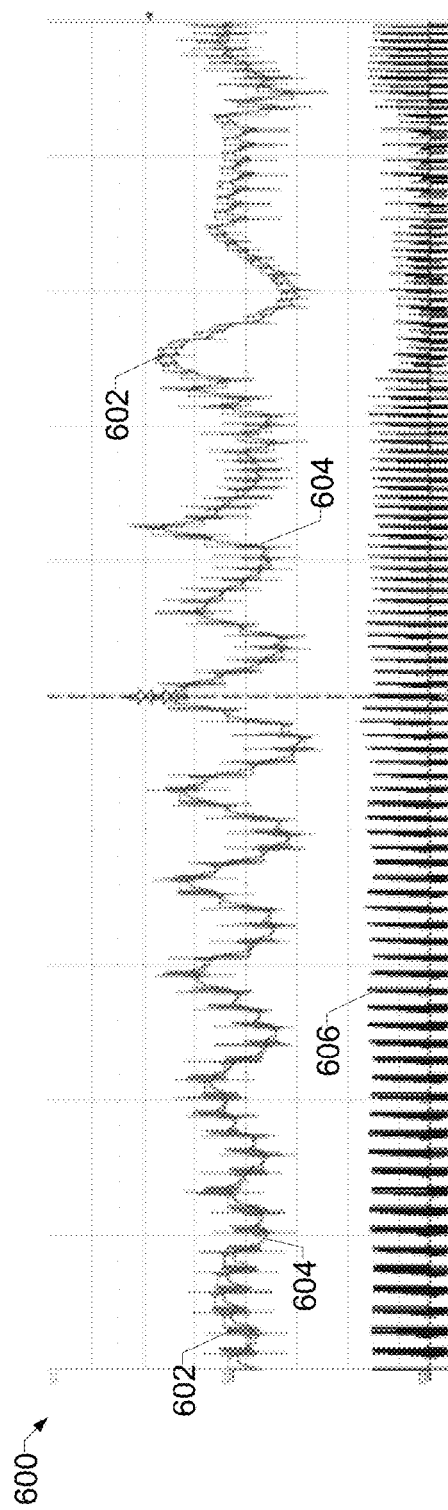
FIGS. 6 and 7 are graphs illustrating measured capacitor voltage waveforms, the AC-coupled voltage signal waveforms, and current signals from the current transformer of FIG. 2.
Figure 7:
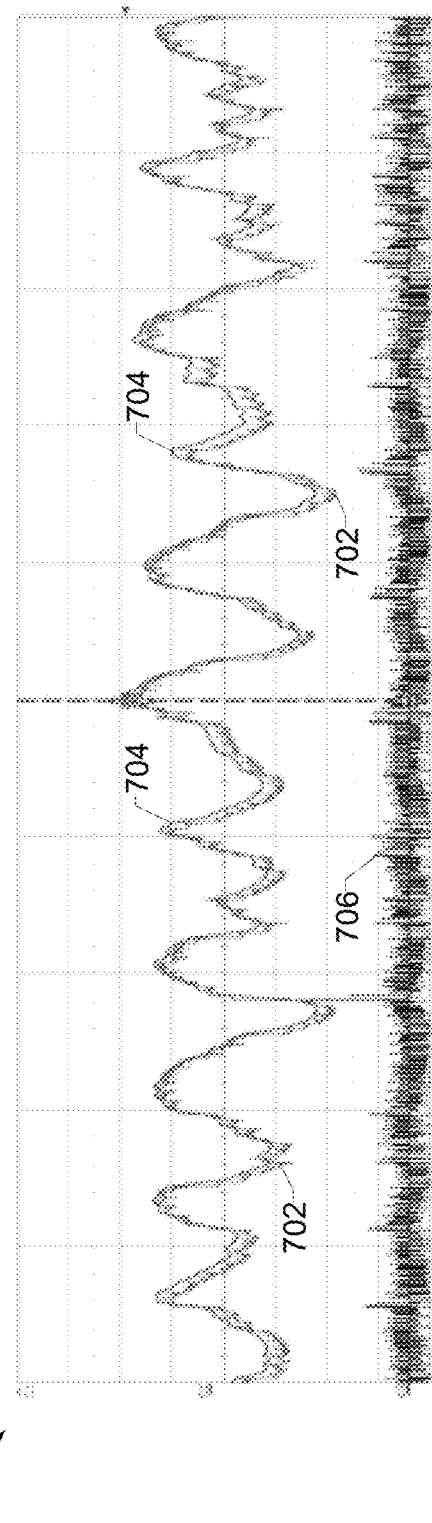

FIGS. 6 and 7 are graphs 600, 700 illustrating measured capacitor voltage waveforms 602, 702, the AC-coupled voltage signal waveforms 604, 704, and current signals 606, 706 from the current transformer 214 of FIG. 2. The example waveforms 602, 604, 702, 704 demonstrate effectiveness of tracking the actual voltage of the series capacitor 204 of FIG. 2 using the voltage estimator 116 of FIG. 3. As shown in FIGS. 6 and 7, the example voltage estimator 116 effectively tracks the lower frequency components (e.g., <1 kHz) of the capacitor voltage. The lower frequency components are the frequency range of interest, because the lower frequency oscillations in the capacitor voltage can lead to transformer saturation. The PWM frequency is effectively filtered, which reduces or avoids responses to very short excursions in the capacitor voltage.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a switched mode power supply, comprising:
   a transformer configured to transform an input voltage to a welding-type voltage;
   a capacitor in series with a primary winding of the transformer; and
   switches configured to control a voltage applied to a series combination of the primary winding of the transformer and the capacitor;
   a voltage estimator coupled to the transformer and configured to output a signal representative of an alternating-current (AC)-coupled voltage at the capacitor, wherein the voltage estimator comprises an integrator and a filter configured to convert a current measurement to a measurement of the AC-coupled voltage across the capacitor;
   a flux accumulator configured to determine a net flux in the transformer based on the voltage applied to the series combination of the primary winding of the transformer and the capacitor; and
   a controller configured to control the switches based on the net flux in the transformer and the signal representative of the AC-coupled voltage at the capacitor.

2. The welding-type power supply as defined in claim 1, further comprising a current transformer coupled to the capacitor, the voltage estimator to determine the AC-coupled voltage at the capacitor by measuring current flowing through the current transformer.

3. The welding-type power supply as defined in claim 1, wherein the controller is configured to control the switches to maintain the net flux in the transformer within a predetermined amount from zero.

4. The welding-type power supply as defined in claim 1, wherein the controller is configured to apply a corrective factor to the net flux for controlling the switching when the signal representative of the AC-coupled voltage is outside of a range.

5. The welding-type power supply as defined in claim 1, wherein the voltage estimator is configured to measure the voltage of the capacitor, measure the voltage at the primary of the transformer,-measure a voltage at a secondary winding of the transformer, or measure a voltage at a third winding of the transformer.

6. The welding-type power supply as defined in claim 1, wherein the flux accumulator is configured to determine the net flux in the transformer based on the signal representative of the AC-coupled voltage.

7. The welding-type power supply as defined in claim 6, wherein the controller is configured to modify duty cycles of the switches based on the net flux in the transformer.

8. The welding-type power supply as defined in claim 1, wherein the switched mode power supply is a stacked full bridge configuration, a half bridge configuration, or a full bridge configuration.

9. The welding-type power supply of claim 1, wherein the flux accumulator is configured to weight flux added to the determined net flux during each cycle of the switched mode power supply based on the signal representative of the AC-coupled voltage across the capacitor during each cycle.

10. A method, comprising:
    generating a signal representative of an alternating-current (AC)-coupled voltage at a capacitor coupled to a primary of a transformer of a switched mode power supply, wherein the generating of the signal representative of the AC-coupled voltage comprises integrating and filtering samples of a current;
    determining a net flux in the transformer; and
    controlling switches of the switched mode power supply to apply a voltage to the transformer based on the net flux in the transformer and the signal representative of the AC-coupled voltage at the capacitor.

11. The method as defined in claim 10, further comprising applying a corrective factor to the net flux when the signal representative of the AC-coupled voltage is outside of a range.

12. The method as defined in claim 10, wherein the generating of the signal representative of the AC-coupled voltage comprises measuring current through a current transformer coupled to the primary of the transformer.

13. The method as defined in claim 10, further comprising determining a corrective factor based on the signal, the determining of the net flux in the transformer being based on the corrective factor.

14. The method as defined in claim 10, wherein the controlling of the switches comprises maintaining the net flux in the transformer within a predetermined amount from zero.

15. The method as defined in claim 10, wherein the determining of the net flux in the transformer is based on the signal representative of the AC-coupled voltage.

16. The method as defined in claim 10, wherein the controlling of the switches comprises modifying duty cycles of the switches based on the net flux in the transformer.

17. The method as defined in claim 10, wherein the controlling of the switches comprises controlling a stacked full bridge configuration, a half bridge configuration, or a full bridge configuration.

18. The method as defined in claim 10, wherein the determining of the AC-coupled voltage comprises at least one of measuring the voltage at the capacitor, measuring the voltage at the primary of the transformer, measuring the voltage at a secondary winding of the transformer, or measuring the voltage at a third winding of the transformer.

19. The method as defined in claim 10, further comprising controlling the switched mode power supply to transform an input voltage to a welding-type voltage or a welding-type current.

20. The method of claim 10, wherein net flux is determined via adding a flux of each cycle of the switched mode power supply, and wherein the flux of each cycle is weighted based on the signal representative of the AC-coupled voltage across the capacitor during each cycle.

21. A welding-type power supply comprising:
   a switched mode power supply:
   a flux accumulator configured to monitor a signal representative of an alternating-current (AC)-coupled voltage at a capacitor coupled in series to a transformer to estimate magnetic flux in the transformer, wherein the signal representative of the AC-coupled voltage at the capacitor is generated via integrating and filtering a current measurement at the capacitor, and
   a controller configured to control the switches based on the estimated magnetic flux in the transformer.

* * * * *